A. W. GETCHELL.
COTTON PICKER.
APPLICATION FILED JUNE 21, 1909.
988,566.
Patented Apr. 4, 1911.
2 SHEETS—SHEET 1.
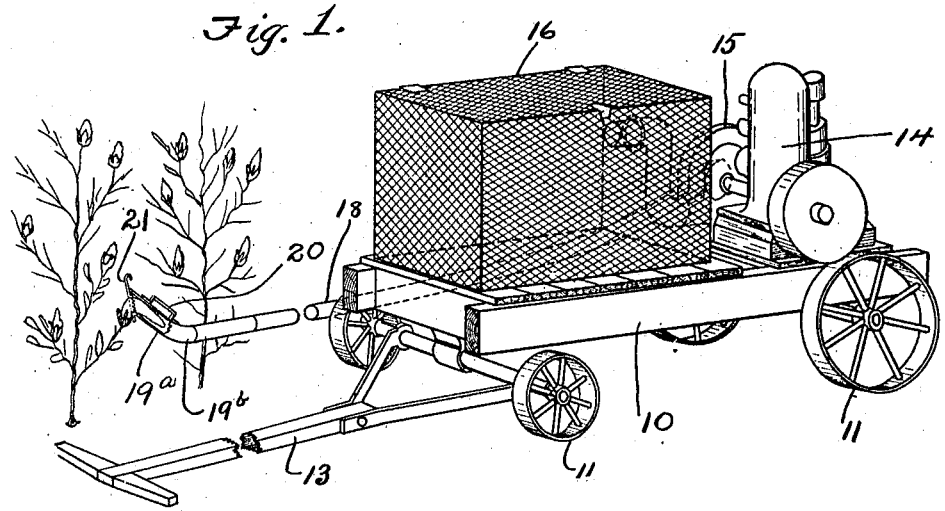
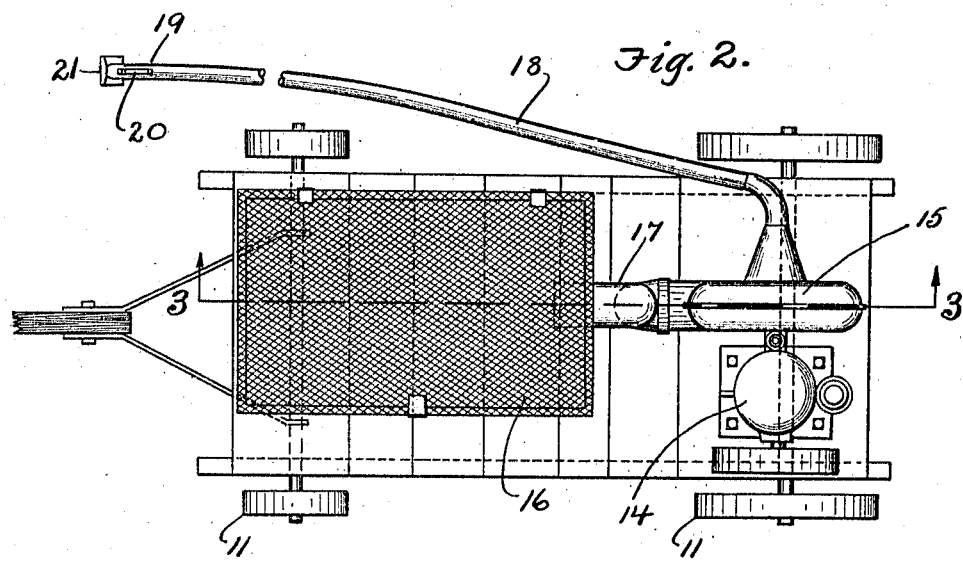
WITNESSES
Robert L. Auten
H. J. Gettins.
INVENTOR
Augustus W. Getchell
By
ATTORNEYS A. W. GETCHELL.
COTTON PICKER.
APPLICATION FILED JUNE 21, 1909.
988,566.
Patented Apr. 4, 1911.
2 SHEETS—SHEET 2.
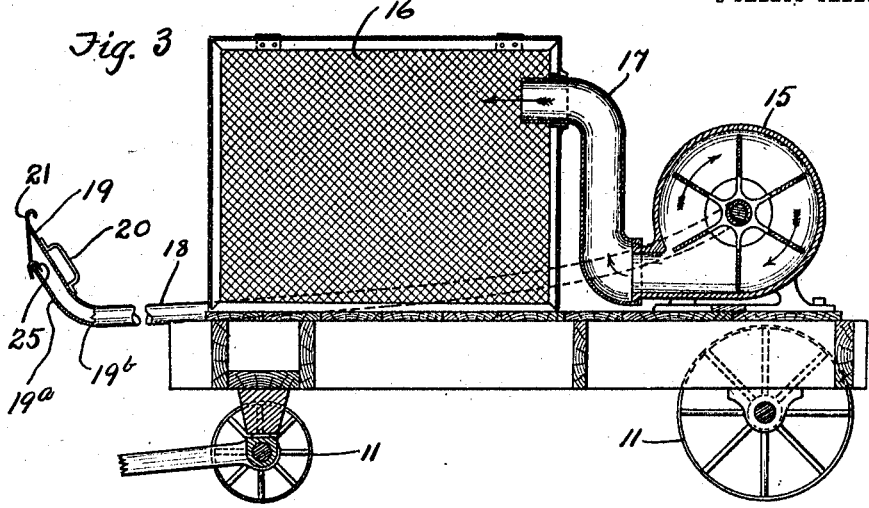
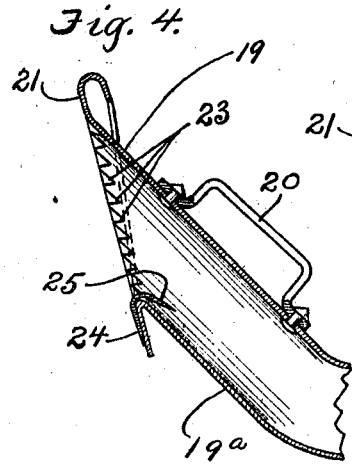
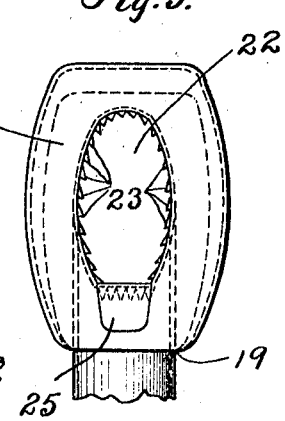
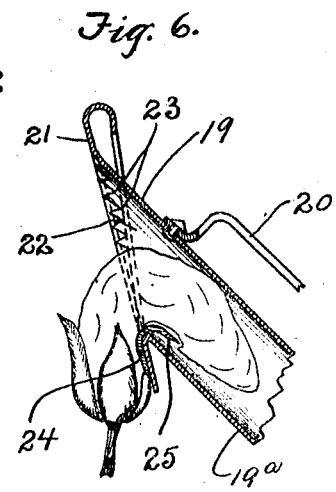
WITNESSES
Robert L. Austin
H. J. Gettins
INVENTOR
Augustus W. Getchell
By
ATTORNEYS

UNITED STATES PATENT OFFICE.

AUGUSTUS W. GETCHELL, OF LAKEWOOD, OHIO.

COTTON-PICKER.

988,566.   Specification of Letters Patent.   Patented Apr. 4, 1911.

Application filed June 21, 1909. Serial No. 503,286.

*To all whom it may concern:*

Be it known that I, AUGUSTUS W. GETCHELL, a citizen of the United States of America, residing at Lakewood, in the county of Cuyahoga and State of Ohio, have invented certain new and useful Improvements in Cotton-Pickers; and I hereby declare the following to be a full, clear, and exact description of the invention, such as will enable others skilled in the art to which it pertains to make and use the same.

This invention relates to improvements in cotton pickers and has for its object the provision of a cotton picker which is more efficient and which will pick and gather cotton more easily and more successfully than the cotton pickers heretofore employed.

More particularly the invention relates to a cotton picker comprising a suitable fan or suction device and a suction tube provided with a picker or nozzle, the mouth of which is designed to be presented to the cotton in a manner such that the cotton is drawn therein and engaged by means arranged in the throat of the nozzle so that a slight movement of the nozzle will disengage the cotton from the pod and the current of air passing down through the nozzle and suction tube will deposit the cotton in a receptacle prepared therefor, the whole being suitably mounted on a frame or truck designed to be drawn through the cotton field.

In the preferred use and embodiment of my invention the cotton is picked by a downward suction in combination with a manual movement of the picker member on the end of the suction tube and which is adapted to positively engage the cotton boll when it is drawn therein. The picker member is so constructed that when presented to a boll of cotton it will partially inclose the cotton and the throat of the picker will be downwardly inclined from the normal or vertical position of the boll so that the suction produced by the fan will produce an inward and downward current of air which will draw the cotton boll in through the mouth of the picker and fold it down over the lower edge thereof.

The inlet opening in the picker at the end of the suction tube is preferably elongated or elliptical and is in a plane which when the picker member is in its normal position is inclined to the perpendicular in a forwardly direction, and the periphery of the inlet opening is preferably provided with inwardly and rearwardly extending teeth which engage the cotton and prevent the withdrawal thereof when the picker member is moved manually to disengage the boll from the pod.

The invention may be further briefly summarized as consisting in certain novel details of construction and combinations and arrangements of parts which will be described in the specification and set forth in the appended claims.

For an understanding of my invention reference is had to the accompanying drawings in which—

Figure 1 is a perspective view of a cotton picker constructed in accordance with my invention and showing its manner of use, parts being broken away. Fig. 2 is a plan view of the same, parts being broken away. Fig. 3 is a section on line 3—3, Fig. 2. Fig. 4 is a detail view of the picker member in section, on an enlarged scale. Fig. 5 is a front view of the picker member. Fig. 6 is a sectional view of the picker member showing the cotton boll therein.

Referring now to the figures of the drawings 10 represents the frame, and 11 the ground wheels of a suitable vehicle upon which the different parts of the cotton picker are supported. The vehicle is designed to be drawn or propelled through the field in any suitable manner, but in this case I have shown for this purpose a tongue 13. Supported on the rear portion of the frame is an engine 14, such as a gasolene engine, which drives a fan or blower 15 also mounted upon the frame adjacent to or at the side of the engine. Supported on the frame 10 forwardly of the engine blower is a receptacle 16 which is designed to receive the cotton from the blower and when full of cotton may be emptied or replaced by an empty receptacle. Connected to the periphery of the blower casing is a discharge tube 17 which projects into the receptacle through a suitable opening in the wall thereof. Also connected to the blower casing, in this case at the center thereof, is a suction tube 18 which is preferably made of flexible material and is of sufficient length that the forward end of the tube can be carried over a considerable area about the vehicle. At the inlet end of the tube 18 is a picker member 19 which is preferably formed of metal and has a portion 19ª inclined with respect to the portion 19ᵇ which is connected to the flexible tube. At the top of the picker member 19 is a suitable handle 20 adapted to be grasped by the operator so that the picker member and tube can be conveniently carried about and presented to the cotton on the plants.

Secured to the free end of the member 19 is a plate 21 having an elongated or somewhat elliptically shaped opening 22 which forms the inlet opening of the suction tube. This opening is provided at its edge or periphery with inwardly and rearwardly projecting teeth 23 formed by serrating the edge of the opening and bending the teeth thus formed rearwardly and inwardly. Also at the bottom of the opening is a plate 24 having teeth 25 which project inwardly a short distance beyond the teeth 23. The plate 21 is obliquely arranged with respect to the axis of the portion 19ª of the member 19 at an angle such that when the picker member is in the normal position for use the plate and the inlet opening 22 are in a plane which is inclined forwardly of the perpendicular as shown clearly in the drawings.

The manner of using this device will now be explained more fully. The vehicle will be drawn through the field between the rows of plants and the operator will grasp the handle and present the nozzle or picker member to the bolls of cotton. Now as we have seen the mouth of the nozzle or picker will be presented to the cotton boll in an approximately vertical position, while the throat of the nozzle in proximity to the mouth is inclined downwardly, therefore the air which is being drawn in through the mouth of the nozzle will move downwardly and when the mouth of the nozzle is presented to the cotton boll the down draft caused by the current of air entering the nozzle will bend the boll downwardly against the lower surface of the throat of the nozzle so that the cotton boll will be practically folded over the bottom edge of the mouth of the nozzle and the portion within the nozzle will engage with the teeth on the lower edge of the mouth. Now as the bush is comparatively rigid a slight forward movement of the picker or nozzle will cause the boll to be disengaged from the pod as the teeth in the mouth of the nozzle prevent it being drawn out of the mouth of the nozzle and the moment the boll is disengaged from the pod the continuous downward draft acting in the same direction as the inclination of the boll will draw the boll through the tube and into the receptacle prepared for it. When the receptacle is full it may be replaced by a new receptacle. It may here be remarked that the receptacle is completely made of an open mesh so that no portion thereof will offer resistance to the escape of the air while retaining the cotton.

What I claim is,—

1. In a pneumatic cotton picker, a suction device, a suction tube connected thereto and provided with a picker member having at the end thereof a plate arranged obliquely with respect to the axis of the picker member and having an inlet opening, the edge of said plate around said opening being provided with inwardly inclined teeth so that the inwardly and downwardly directed current of air produced by the operation of the suction device will draw in the cotton boll and fold it down into engagement with the teeth thereby holding the cotton boll against withdrawal from the mouth of the picker but leaving it free to move down into the tube when detached from the pod.

2. In a pneumatic cotton picker, a suction device, a suction tube connected thereto and provided with a picker member having at the end thereof a plate arranged obliquely with respect to the axis of the picker member and having an elliptical shaped inlet opening, the edge of the plate at said opening being provided with inwardly inclined teeth.

3. In a pneumatic cotton picker, a suction device, a suction tube connected to the suction device and a picker member arranged on the intake end of said tube, said picker member comprising a nozzle having the mouth thereof arranged obliquely with respect to the axis of the throat of the nozzle, said mouth being provided with inwardly projecting teeth and the arrangement being such that the air sucked through said nozzle will cause the cotton boll to be drawn inwardly and downwardly over the bottom edge of the mouth and into engagement with the teeth therein.

4. In a pneumatic cotton picker, a vehicle having a suction device, an engine for operating said device and a receptacle for receiving the cotton mounted thereon, said suction device having connected thereto a discharge tube leading to the receptacle and a suction tube having at its end a picker member having at the intake end thereof a plate arranged obliquely with respect to the axis of the picker member, said plate being provided with an inlet opening, the edge of the plate around said opening being provided with inwardly inclined teeth, so that the inwardly and downwardly directed current of air produced by the operation of the suction device will draw in the cotton boll and fold it down into engagement with said teeth.

In testimony whereof, I sign the foregoing specification, in the presence of two witnesses.

AUGUSTUS W. GETCHELL.

Witnesses:
 VICTOR C. LYNCH,
 N. L. McDONNELL.